(12) United States Patent
Gavade et al.

(10) Patent No.: US 9,332,292 B2
(45) Date of Patent: May 3, 2016

(54) MEDIA PLAYLISTS WITH SELECTIVE MEDIA EXPIRATION

(75) Inventors: Sameer Gavade, Irving, TX (US); Venkata S. Adimatyam, Irving, TX (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 324 days.

(21) Appl. No.: 13/586,203

(22) Filed: Aug. 15, 2012

(65) Prior Publication Data

US 2014/0052823 A1 Feb. 20, 2014

(51) Int. Cl.
*G06F 15/16* (2006.01)
*H04N 21/262* (2011.01)
*H04N 21/254* (2011.01)
*G06F 17/30* (2006.01)

(52) U.S. Cl.
CPC .... *H04N 21/26258* (2013.01); *G06F 17/30053* (2013.01); *H04N 21/2541* (2013.01); *H04N 21/26291* (2013.01)

(58) Field of Classification Search
CPC ............... H04L 65/80; H04L 65/4092; H04L 29/06207; H04L 65/60
USPC .................................. 709/219, 203, 231, 248
See application file for complete search history.

(56) References Cited

U.S. PATENT DOCUMENTS

| 6,314,565 | B1* | 11/2001 | Kenner et al. | 717/171 |
|---|---|---|---|---|
| 7,424,528 | B2* | 9/2008 | Cherkasova et al. | 709/224 |
| 7,552,220 | B2* | 6/2009 | Marmigere et al. | 709/228 |
| 8,453,141 | B1* | 5/2013 | Poole | 717/175 |
| 8,555,163 | B2* | 10/2013 | Sood et al. | 715/704 |
| 9,047,235 | B1* | 6/2015 | Barraclough et al. | |
| 2002/0116517 | A1* | 8/2002 | Hudson et al. | 709/231 |
| 2003/0069854 | A1* | 4/2003 | Hsu et al. | 705/59 |
| 2008/0033806 | A1* | 2/2008 | Howe et al. | 705/14 |
| 2009/0210899 | A1* | 8/2009 | Lawrence-Apfelbaum et al. | 725/34 |
| 2010/0169453 | A1* | 7/2010 | Biderman et al. | 709/217 |
| 2010/0198982 | A1* | 8/2010 | Fernandez | 709/231 |
| 2012/0203869 | A1* | 8/2012 | Caruso et al. | 709/219 |
| 2012/0311091 | A1* | 12/2012 | Dingler et al. | 709/219 |
| 2013/0290402 | A1* | 10/2013 | Gavade et al. | 709/203 |

* cited by examiner

*Primary Examiner* — Brian J Gillis
*Assistant Examiner* — Steve Lin

(57) ABSTRACT

A media server may receive a request for a playlist from a client computing device, the playlist being associated with expiration information indicative of when the playlist becomes obsolete. The media server may provide the requested playlist to the client computing device. The media server may revise the playlist to generate a refreshed version of the playlist and the client computing device may request the refreshed version of the playlist according to the expiration information.

22 Claims, 7 Drawing Sheets

MEDIA PLAYLISTS WITH SELECTIVE MEDIA EXPIRATION

BACKGROUND

In some media systems, a media file has to be fully downloaded before it can be played. In other systems, a table of contents of a media file is placed at the beginning of the file such that playback of the media file may be initiated before the download is complete. Another approach to media playback is to split the file into multiple smaller files, and then download and play each of the smaller files in sequence. While each of these approaches has different advantages, each still presents difficulties to servers with respect to the expiration of hosted content.

DETAILED DESCRIPTION

Figure 1:
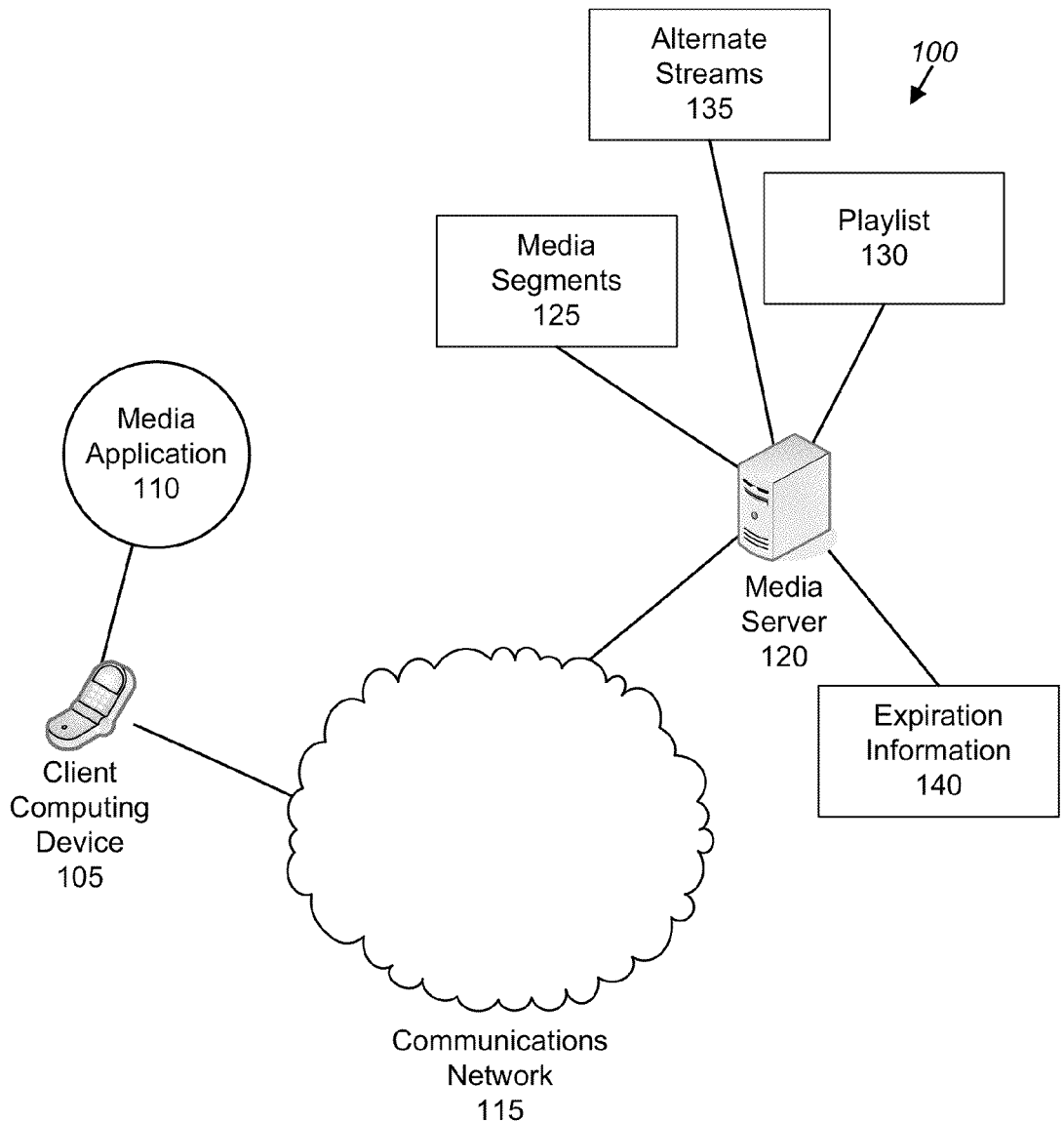
FIG. 1 illustrates an exemplary media content streaming communications system including a client computing device having a media application and in communication with a media server over a communications network.

One approach to media streaming is to split a file into a plurality of segments and publish the segments on a media server. An index file may be placed on the media server, which may be retrieved by a client to allow the client to retrieve the plurality of segments in a desired playback order. In some cases, the playlist may direct the client to download a segmented media file that was prerecorded. In other cases, the playlist may direct the client to receive a segmented stream of a live broadcast.

The Hypertext Transfer Protocol (HTTP) live streaming (HLS) protocol is an example of such a type of media streaming. In HLS, a media file may be split into a plurality of segments. These segments may be encoded as a plurality of Moving Picture Experts Group (MPEG)-2 transport stream files, often given the .ts file extension. An index file, or playlist, may include a listing of uniform resource identifiers (URIs) of the segments to be retrieved. These playlists may be formatted according to the rules for the M3U8 file format, which is a derivation of M3U plaintext playlist file format containing UTF-8 encoded text. A client may receive the playlist via a URI, and using the playlist, the client may download the segments in order to play the media file. HLS playlists may further specify multiple alternate streams at different bit rates such that the client may download media content according to available network bandwidth.

Despite these features, media streaming protocols such as HLS do not support a specification of an expiration parameter for hosted media content listed in the playlist. Lacking such functionality, servers cannot reliably indicate to clients when media content will expire or control when clients refresh the downloaded playlists. For example, clients may continue to access expired hosted content, thereby preventing server from reliably updating the hosted content once the playlist has been published. One way to address these deficiencies is for a server to un-publish and then re-publish the files using a different playlist entirely. However, the server may still be required to maintain the out-of-date files indefinitely, as clients may retain cached copies of the out-of-date playlists.

Expiration information may be associated with media content to address these deficiencies. The expiration information may be used to indicate when media content may become obsolete. The expiration information may specify a timeout or a point in time after which the media content may expire. The expiration information may indicate the expiration of one or more of a playlist, a media stream, and an individual media segments listed in the playlist. As some examples, the expiration information may specify a unit of time that may be waited after receipt of the playlist by the client, a timeout that may be waited after receipt of the playlist, an amount of time after a date stamp or other time associated with the playlist, or a particular day or time of day after which the playlist expires. In some cases, the expiration information may specify a period for refreshing the playlist. To use HLS as a more specific example, an EXPIRES tag may be added to entries of an M3U8 playlist to specify a parameter indicative of when alternate streams or media segments expire.

A client configured to utilize the expiration information may fetch a playlist and may determine an expiration of the playlist according to the expiration information. Upon expiration of the playlist, the client may be configured to refresh the playlist. In some examples, the client may be configured to clear any downloaded media content associated with the expired playlist. Moreover, the server may be aware of when the playlist is configured to expire. Because the client may be configured to receive an updated playlist, the server may remove or update expired content associated with the expired playlist without impairing the ability of the client to continue to stream the content. Through use of the expiration information, the server may be able to enforce updates of hosted content even after playlists and segment files have been published.

Expiration information may provide for additional benefits beyond coordinated updates. As an example, expiration information may address issues with out-of-date versions of a playlist being cached. A client may determine, after receiving a playlist or reference to a playlist that has expired according to associated expiration information, to request a new copy of the playlist before attempting playback, without attempting to reuse stale content from an expired playlist.

As another benefit, the expiration information may be set to allow the server to reconfigure the refreshed playlist. For example, as server load or available server bandwidth changes, the server may revise the listing of alternate streams that are being made available to clients or may adjust aspects of the encoding of the media segments of a chosen media content stream. The use of alternate media content streams is discussed in more detail below.

In some cases, the expiration information may be set to different timeout values for different alternate streams. For example, such a feature may be useful to allow certain alternate streams that are more likely to be updated to be revisited by the client more often, without requiring a refresh for clients using other alternate streams.

FIG. 1 illustrates an exemplary media content streaming communications system 100 including a client computing device 105 having a media application 110 and in communication with a media server 120 over a communications network 115. The media server 120 may be configured to store information to facilitate the streaming of media content to the client computing device 105. The stored information may include media segments 125, playlists 130, alternate streams 135, and expiration information 140. System 100 may take many different forms and include multiple and/or alternate components and facilities. While an exemplary system 100 is shown in FIG. 1, the illustrated exemplary components are not intended to be limiting, and additional or alternative components and/or implementations may be used.

The client computing device 105 may be implemented as a combination of hardware and software, and may include one or more software applications or processes for causing one or more computer processors to perform the operations of the client computing device 105 described herein. One such application may be the media application 110. The client computing device 105 may be configured to execute the media application 110 to perform operations regarding the selective retrieval and playback of media content from the media server 120. Exemplary media content may include television shows, movies, streaming video, streaming music, and internet radio, among other possibilities. Further aspects of the media application 110 are discussed in detail below.

The communications network 115 may provide communications services, such as packet-switched network services (e.g., Internet access, VoIP communication services) to devices such as the client computing device 105 and the media server 120. In some examples, the communications network 115 may provide circuit-switched services (e.g., plain old telephone service (POTS), integrated services digital network (ISDN) services). Communication over the communications network 115 may include any combination of wired or wireless forms of communication. For example, communication may be by cable, optical fibers, cellular towers, etc.

The media server 120 may be configured to host media content to be provided to the client computing device 105. In many cases, the media server 120 may be configured to host the media content as a series of small files, referred to as media segments 125. To use HLS as an example, an instance of media content may be encoded as a MPEG-2 transport stream of MPEG-4 encoded content (e.g., H.264 advanced video coding (AVC), Advanced Audio Coding (AAC) audio). As hosted on the media server 120, the media stream may be broken up into a plurality of media segments 125, each media segment 125 encoded as one of a plurality of MPEG-2 transport stream files. These media segments 125 are often given the .ts file extension. Media segments 125 may be of relatively short duration, such as about 10 seconds in some instances, but may be shorter or longer as the situation requires.

The media server 120 may also be configured to host a playlist 130 configured to include a listing of network addresses of the plurality of media segments 125 that make up an instance of media content. The playlist 130 may be assigned a network addresses by the media server 120 to facilitate access to the playlist 130 from client computing devices 105. For example, some or all of the network addresses referencing and included in the playlist 130 may be in the form of URIs.

Figure 2:
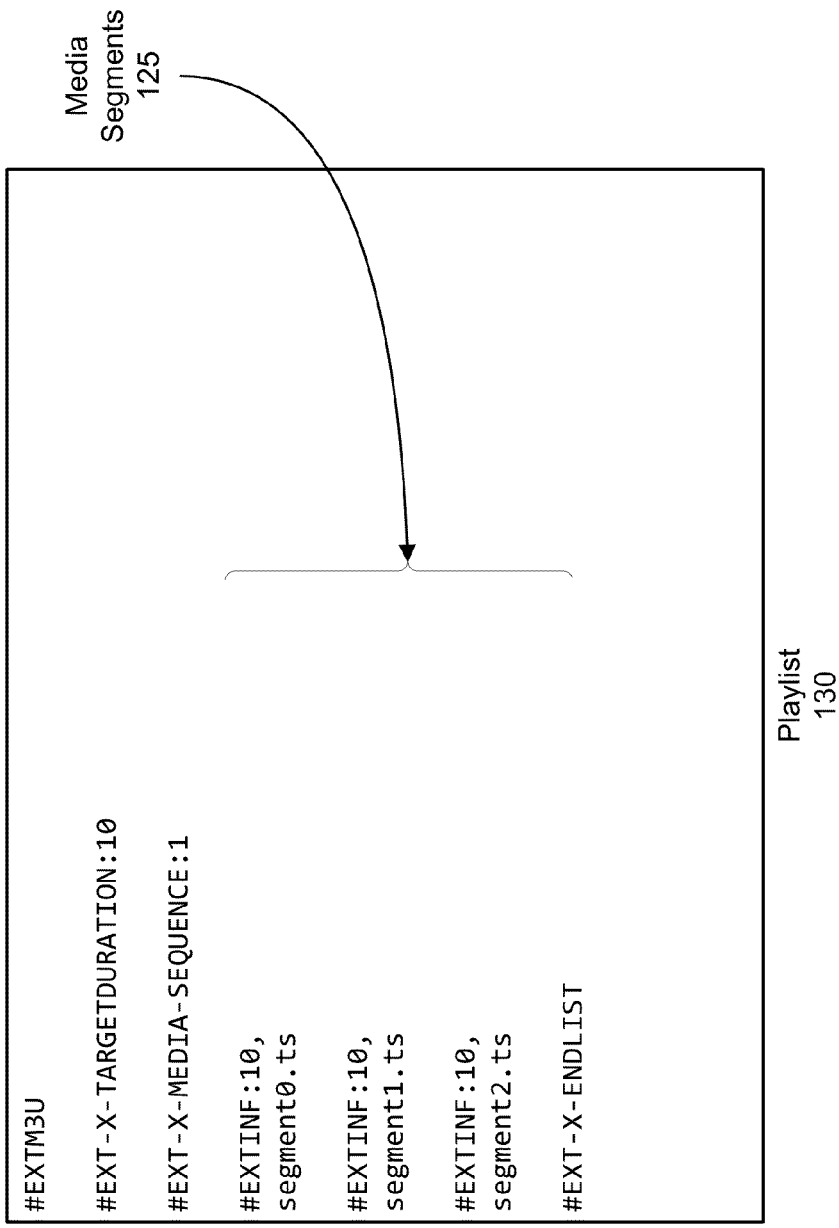
FIG. 2 illustrates an exemplary playlist including a listing of a plurality of media segments.

FIG. 2 illustrates an exemplary playlist 130 including a listing of a plurality of media segments 125. As the exemplary playlist 130 is shown as being an HLS playlist 130, the initial tag of the playlist 130 indicates that the file format conforms to the M3U8 standard. The playlist 130 may include additional tag information such as an EXT-X-TARGETDURATION tag indicative of an approximate length of the longest media segment 125 listed in the playlist 130, and an EXT-X-MEDIA-SEQUENCE tag indicative of a sequence number of the first media segment 125 that appears in the playlist 130. Following the tag information, the playlist 130 may include a listing of media segments 125, as illustrated including: segment0.ts, segment1.ts, and segment2.ts. Finally, the playlist 130 may include an EXT-X-ENDLIST tag indicative of the end of the listing of media segments 125.

The media application 110 may be configured to direct the client computing device 105 to request the playlist 130 from the media server 120. To use HLS as an example, the media application 110 may be configured to download an HTML file referencing a playlist 130 by way of a SRC attribute of an HTML <VIDEO> tag. The media application 110 may identify the network address of the playlist 130 from the SRC attribute, and may cause the client computing device 105 to retrieve the playlist 130 according to the network address.

The media application 110 may be further configured to parse the retrieved playlist 130 to identify the network locations of the media segments 125 of the media content to be played. The media application 110 may then direct the client computing device 105 to retrieve the plurality of media segments 125 in playback order. When the media application 110 has sufficient data downloaded to begin playback (and potentially has a sufficient buffer of data) the media application 110 presents the reassembled stream to the user.

The media application 110 may continue to download media segments 125 and present the media content until the media application 110 encounters an end of the playlist 130. For example, continuing with the HLS example, media playback may continue until the media application 110 encounters the #EXT-X-ENDLIST tag of the playlist 130.

In some cases, the media server 120 may be configured host multiple versions of media segments 125 corresponding to an instance of media content, where each version of the media segments 125 is encoded at a different bandwidth. These different versions of the media content may be referred to as alternate streams 135. The media server 120 may also be configured to host a type of playlist 130 configured to provide a listing of alternate streams 135 of media segments 125, rather than providing a listing of the media segments 125 themselves. This type of playlist 130 describing the alternate streams 135 may be referred to as a variant playlist 130.

Figure 3:
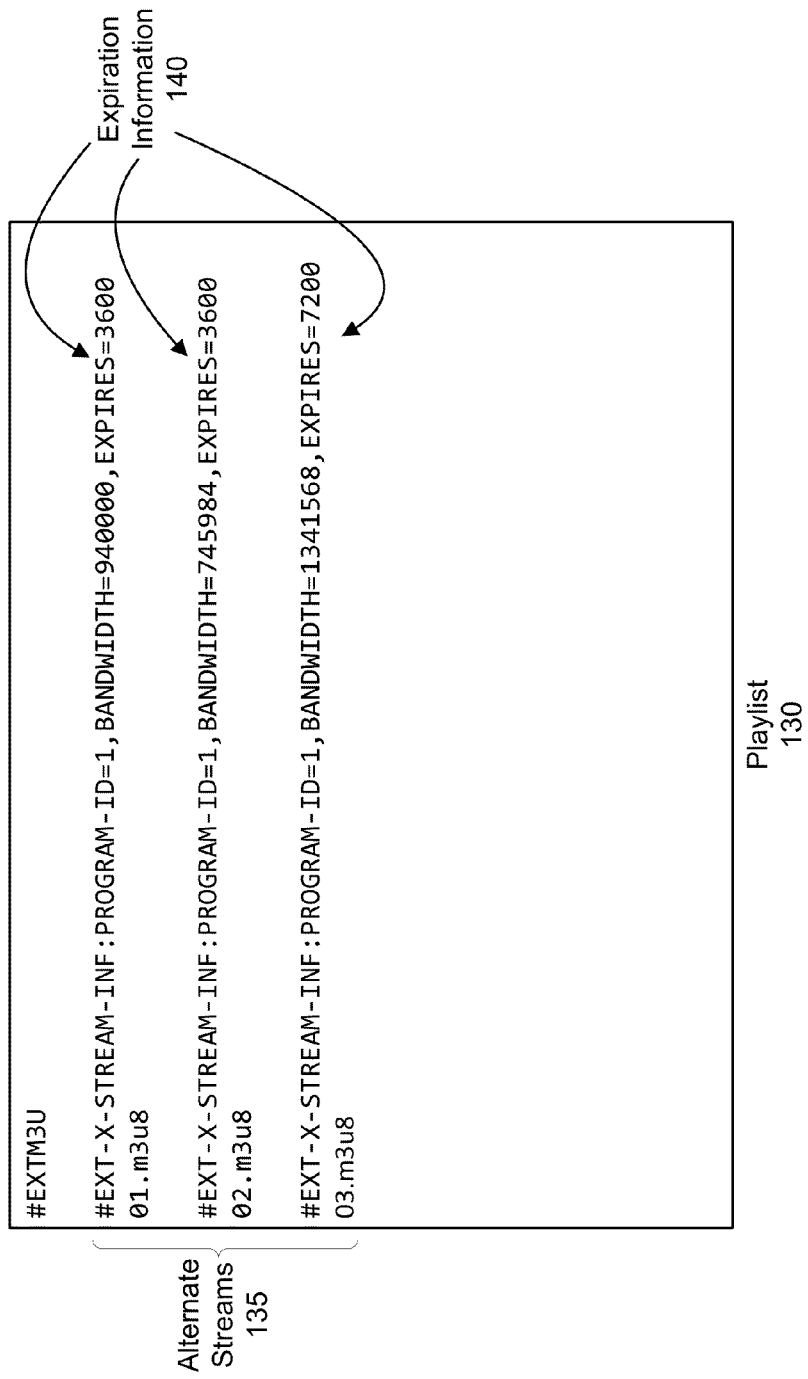
FIG. 3 illustrates an exemplary playlist referencing a plurality of alternate streams associated with expiration information.

FIG. 3 illustrates an exemplary playlist 130 referencing a plurality of alternate streams 135 associated with expiration information 140. Each alternate stream 135 may be specified in the form of a network address of a playlist 130 including a different listing of media segments 125, such as the playlist 130 illustrated in FIG. 2. The exemplary playlist 130 of FIG. 3 is shown as being an HLS variant playlist 130 includes references to three different alternate streams 135, each alternate stream 135 providing the same media content but at a different bandwidth. Each of the alternate streams 135 in the exemplary playlist 130 is also associated with expiration information 140 in the form of EXPIRES tags included in the definition of each of the alternate streams 135.

The first alternate stream 135 corresponds to a required bandwidth rate of 940,000 bits-per-second (bps) and expires after 3,600 seconds. The second alternate stream 135 corresponds to a lower bandwidth rate of 745,984 bps and also expires after 3,600 seconds. The third alternate stream 135 corresponds to a higher bandwidth of 1,341,568 bps and expires after 7,200 seconds. While the exemplary alternate streams 135 reference bandwidth in bps and expiration information 140 in seconds, other units are equally suitable. Moreover, while the exemplary playlist 130 includes expiration information 140 in association with each of the alternate streams 135, in other examples the playlist 130 may be associated with a single item of expiration information 140 applicable to each of the included alternate streams 135. In some cases the alternate streams 135 may be hosted by the media server 120, while in other cases, one or more the alternate streams 135 may be hosted by another media server 120 referenced in the playlist 130.

In some cases, expiration information 140 may not be specified for each of the alternate streams 135. In such a case, default expiration information 140 may be used for those alternate streams 135, such as that the content never expires or that the content expires after a default amount of time. In other cases, the expiration information 140 may explicitly specify that an item does not expire. For example, an EXPIRES tag may include a keyword such as NEVER to explicitly indicate content that does not expire.

As mentioned above, the client computing device 105 may be configured to execute the media application 110 to perform operations regarding the selective retrieval and playback of media content from the media server 120. As an example of such an interaction, the media application 110 may be configured to cause the client computing device 105 to request the exemplary variant playlist 130 from the media server 120. The media server 120 may accordingly return the variant playlist 130 to the client computing device 105.

The media application 110 may be further configured to stream a version of the media content with a bandwidth best suited to the client computing device 105. For example, if the client computing device 105 is connected to the communications network 115 over a relatively high-bandwidth Wi-Fi connection, the media application 110 may cause the client computing device 105 to choose a higher-quality version of the stream with higher bandwidth, such as the illustrated third alternate stream 135. If the client computing device 105 is connected to the communications network 115 over a relatively lower-bandwidth 3G connection, the media application 110 may cause the client computing device 105 to choose a lower-quality version of the stream with lower bandwidth, such as the illustrated second alternate stream 135.

The media application 110 may be further configured to monitor utilized bandwidth while playing the stream. If a higher-quality stream is available in the alternate streams 135 and the bandwidth of the client computing device 105 appears sufficient to support a higher-quality version of the stream, then the media application 110 may be configured to switch to a higher-quality version of the stream. On the other hand, if a lower-quality stream is available and the current bandwidth appears insufficient to support the current stream, the media application 110 may be configured to direct the client computing device 105 to switch to a lower-quality version of the stream. To reduce audible glitches when switching streams, the audio portion may be encoded the same for each alternate stream 135 while the video portion of the stream may be encoded at differing bandwidths.

The media application 110 may be further configured to identify the expiration information 140 associated with the playlist 130, and determine according to the expiration information 140 when the requested playlist 130 will expire or become obsolete. When the playlist 130 is determined to expire, the media application 110 may be further configured send to the media server 120 a request for a refreshed version of the playlist 130. For example, the media application 110 may elect to stream the third alternate stream 135, and may note to refresh the playlist 130 of the third alternate stream 135 after 7,200 seconds as indicated by the associated expiration information 140. Upon expiration of the playlist 130 of the third alternate stream 135, the media application 110 may direct the client computing device 105 to retrieve a refreshed version of the playlist 130 of the third alternate stream 135 from the media server 120.

Figure 4:
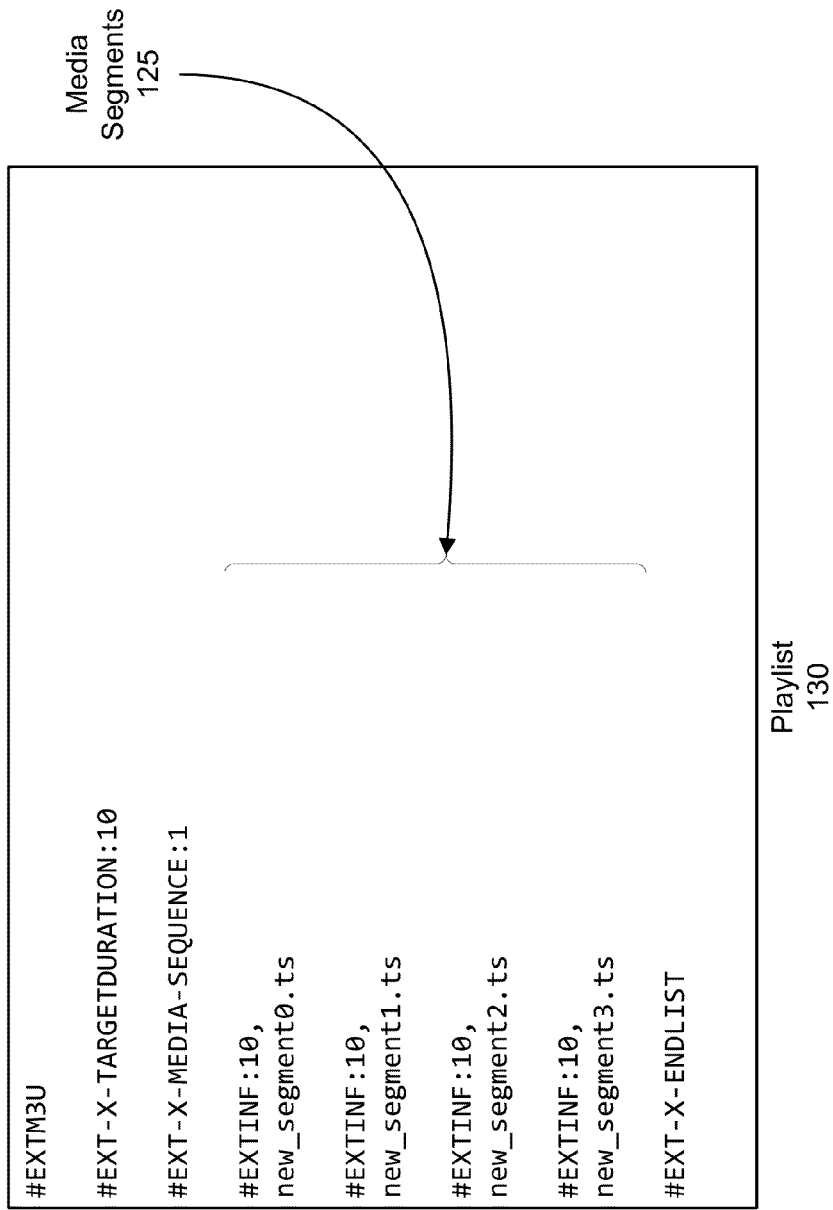
FIG. 4 illustrates an exemplary playlist including a refreshed listing of media segments.

FIG. 4 illustrates an exemplary playlist 130 including a refreshed listing of media segments 125. For example, the exemplary playlist 130 may be a refreshed version of the playlist 130 illustrated in FIG. 2. Where the previous listing of media segments 125 included segment0.ts, segment1.ts, and segment2.ts, the refreshed playlist 130 in the illustrated example includes a refreshed listing of media segments 125 including new_segment0.ts, new_segment1.ts, new_segment2.ts, and new_segment3.ts. Accordingly, through use of the expiration information 140, the media server 120 may be able to provide updates to the media segments 125 after the media segments 125 have been published.

Figure 5:
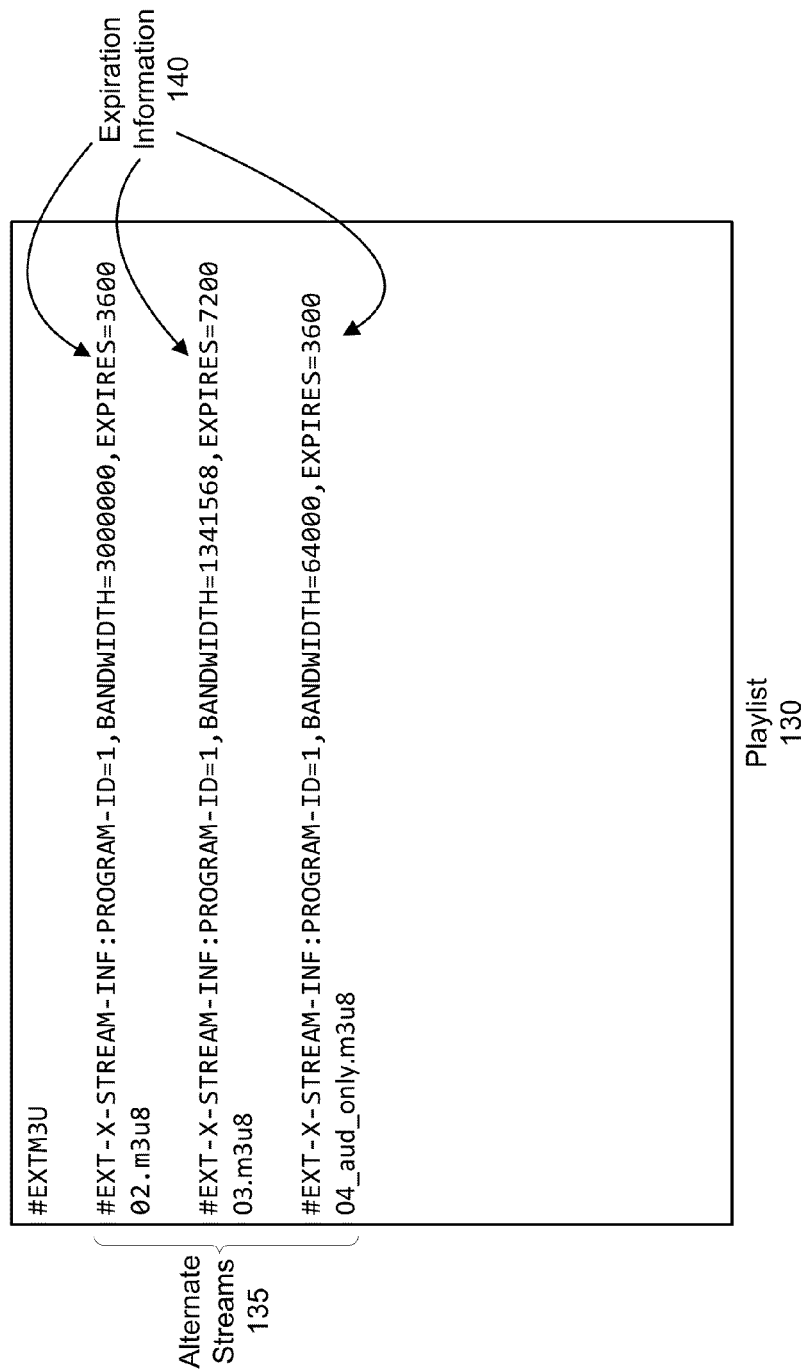
FIG. 5 illustrates an exemplary playlist referencing a refreshed plurality of alternate streams.

FIG. 5 illustrates an exemplary playlist 130 referencing a refreshed plurality of alternate streams 135. In the illustrated example, the exemplary playlist 130 may be a refreshed version of the variant playlist 130 illustrated in FIG. 3. Thus, in addition to providing benefits to playlists 130 includes listings of media segments 125, the expiration information 140 may also allow the media server 120 to enforce updates to the alternate streams 135 in a variant playlist 130 as well.

Updates to a variant playlist 135 may include one or more of: refreshing the listing of alternate streams 135 to add an additional alternate stream 135 not present in the plurality of alternate streams 135 of the expired variant playlist 130, removing an alternate stream 135 from the alternate streams 135 formerly available in the expired variant playlist 130, and providing an existing alternate stream 135 in a refreshed variant playlist 130 but assigned to a different bandwidth. In the refreshed listing of alternate streams 135 in the exemplary variant playlist 130, an audio-only alternate stream 135 variant at 64,000 bps has been added, the alternate stream 135 at 940,000 bps has been removed, and a higher-quality alternate stream 135 at 3,000,000 bps has replaced the 745,984 bandwidth alternate stream 135.

These updates to the listing of alternate streams 135 may be made according to load or utilized bandwidth of the media server 120. For example, if load of the media server 120 or available bandwidth of the media server 120 becomes too high, the media server 120 may refresh the listing of alternate streams 135 made available in a variant playlist 130 to remove high bandwidth alternate streams 135, or to include alternate streams 135 re-encoded to use less bandwidth. On the other hand, if load of the media server 120 or available bandwidth of the media server 120 would support it, the media server 120 may refresh the listing of alternate streams 135 to include one or more higher quality, higher bandwidth, alternate streams 135. In some instances, updates to the listing of alternate streams 135 may be performed to accomplish load-balancing, such as by moving certain of the alternate streams 135 to be hosted on different media servers 120 and adjusting the network addresses of the listed alternate streams 135 to point to the different media servers 120.

In some cases, the expiration information 140 may be set to different timeout values for different alternate streams 135. For example, such a feature may be useful to allow certain alternate streams 135 that are more likely to be updated to be revisited by the client computing device 105 more often, without requiring a request for a refresh for client computing devices 105 using other alternate streams 135.

Moreover, the expiration information 140 may provide for additional benefits beyond merely updating the media segments 125 of the playlist 130. As an example, providing expiration information 140 within the playlist 130 itself may address issues with out-of-date version of the playlist 130 being cached by the client computing device 105 or by a network intermediary between the client computing device 105 and the media server 120. A client computing device 105 parsing a cached playlist 130 that has expired according to the terms of its expiration information 140 may allow the client computing device 105 to request a new copy immediately, without first attempting to download stale or missing media segments 125 using the expired playlist 130.

Figure 6:
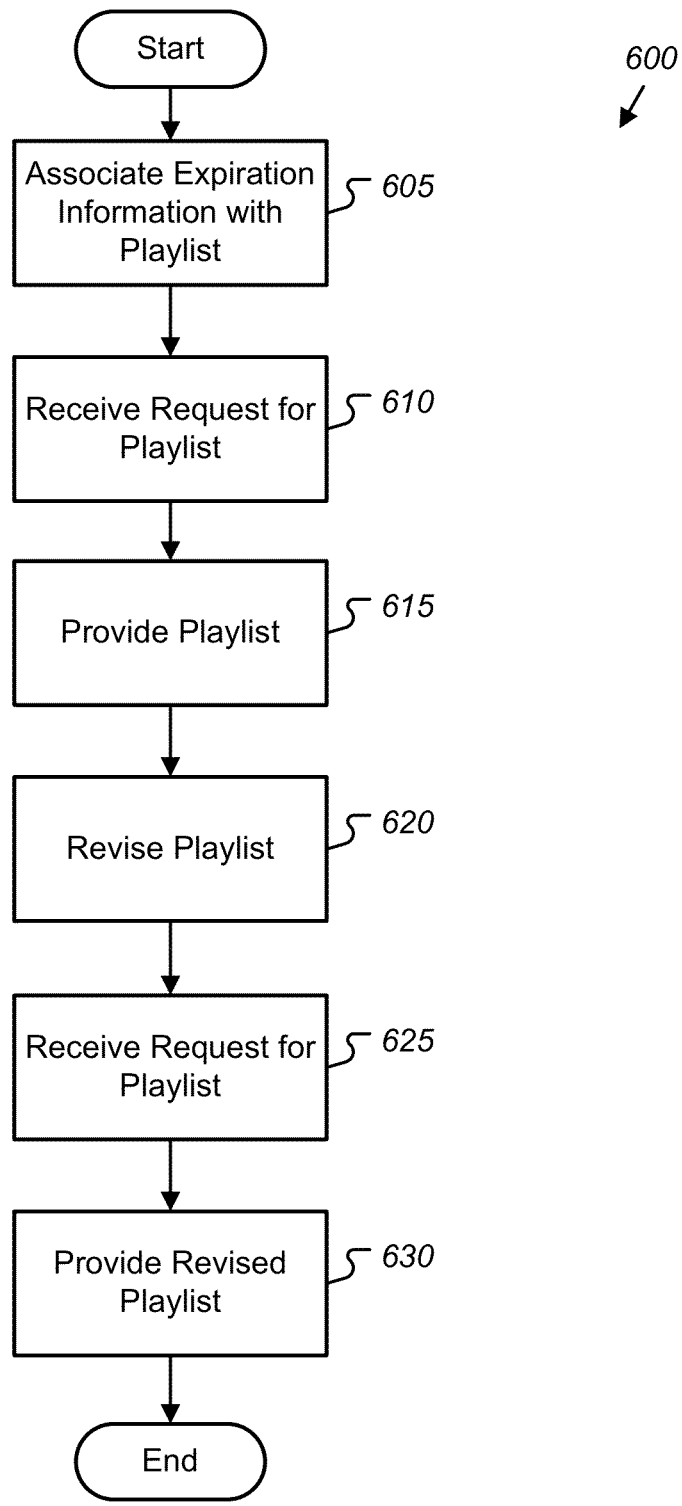
FIG. 6 illustrates an exemplary process for provisioning refreshed playlists according to expiration information.

FIG. 6 illustrates an exemplary process 600 for provisioning refreshed playlists 130 according to expiration information 140. The process 600 may be performed by various devices, such as by a media server 120 connected to a communications network 115.

In block 605, the media server 120 associates expiration information 140 with a playlist 130. For example, the media server 120 may associate each of the alternate streams 135 in a variant playlist 130 with expiration information 140 indicative of when each of the alternate streams 135 may become obsolete. To use HLS as an example, the media server 120 may include EXPIRES tags in the definition of each of the alternate streams 135 in an M3U8 MLS variant playlist 130.

In block 610, the media server 120 receives a request for a playlist 130. For example, a client computing device 105 may execute a media application 110 configured to direct the client computing device 105 to request a playlist 130 associated with one of a plurality of alternate streams 135 specified by a variant playlist 130.

In block 615, the media server 120 provides the playlist 130 responsive to the request. For example, the media server 120 may provide the requested playlist 130 to the client computing device 105 via HTTP. The media server 120 may further provide media segments 125 listed in the playlist 130 to the client computing device 105.

In block 620, the media server 120 revises the playlist 130 to provide a refreshed playlist 130. For example, the media server 120 may be configured to include a refreshed listing of media segments 125 in the playlist 130. In some instances, the media server 120 may be configured to generate the refreshed playlist 130 after providing the playlist 130 to the client computing device 105 but before the expiration information 140 indicates that the playlist 130 expires. In other instances, the media server 120 may generate the refreshed playlist responsive to receiving the request in block 625 below. In some cases, the refreshed playlist 130 may be refreshed based on one or more of load of the media server 120 and changes to available bandwidth of the media server 120. In other cases, the refreshed playlist 130 may replace expired media segments 125 with replacement media segments 125. In still other cases, the refreshed playlist 130 may not change any of the included media content, or may change the expiration information 140 associated with the playlist 130 in the variant playlist 130.

In block 625, the media server 120 receives a request for the refreshed playlist 130. For example, the media application 110 may identify the expiration information 140 associated with the playlist 130, and may determine according to the expiration information 140 when the requested playlist 130 will expire. When the playlist 130 is determined to expire, the media application 110 may send to the media server 120 a request for a refreshed version of the playlist 130. The media server 120 may accordingly receive this client request.

In block 630, the media server 120 provides the refreshed playlist 130 responsive to the request. Accordingly, through use of the expiration information 140, the media server 120 may be able to enforce updates to the media segments 125 and playlists 130 once media segments 125 and playlists 130 have been published. As another example, as load of the media server 120 or available bandwidth of the media server 120 changes, the media server 120 may refresh the listing of alternate streams 135 that are being made available in a variant playlist 130.

After block 630, the process 600 ends. Variations on the process 600 are possible. For example, in the case of a playlist 130 that expires multiple times during playback, blocks 620-630 may be performed multiple times during playback of media content. As another example, the playlist 130 may be configured to include its own expiration information 140 without using a variant playlist 130.

Figure 7:
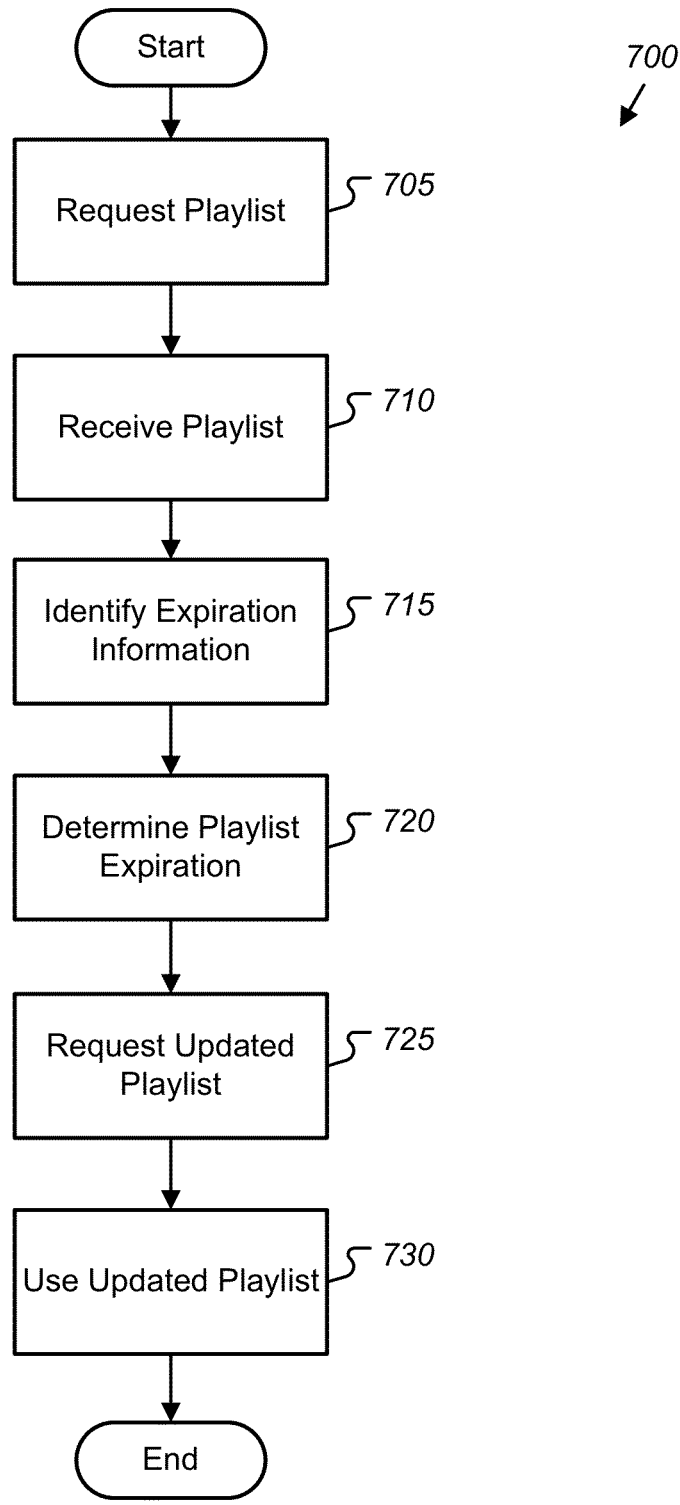
FIG. 7 illustrates an exemplary process for utilizing refreshed playlists according to expiration information.

FIG. 7 illustrates an exemplary process 700 for utilizing refreshed playlists 130 according to expiration information 140. The process 700 may be performed by various devices, such as by a client computing device 105 connected to a communications network 115 and executing a media application 110.

In block 705, the client computing device 105 requests a playlist 130 from a media server 120. For example, the client computing device 105 may be configured to execute a media application 110 configured to retrieve an HTML file referencing a network address of a variant playlist 130 stored on the media server 120. The media application 110 may determine the network address of the variant playlist 130 according to a SRC attribute of a <VIDEO> HTML tag. The media application 110 may further cause the client computing device 105 to retrieve the variant playlist 130 from the media server 120 according to the network address. Based on the variant playlist 130, the media application 110 may cause the client computing device 105 to retrieve a playlist 130 of one of the alternate streams 135 of the variant playlist 130 having a bandwidth best suited to the client computing device 105.

In block 710, the client computing device 105 receives the playlist 130 from the server. For example, client computing device 105 may receive the requested playlist 130 responsive to the request for the playlist 130 having a bandwidth best suited to the client computing device 105.

In block 715, the client computing device 105 identifies expiration information 140 associated with the received playlist 130. For example, the media application 110 may identify the expiration information 140 indicative of when the playlist 130 may become obsolete by way of the variant playlist 130. In some cases the expiration information 140 may be associated with individual items in the playlist 130, while in other cases the playlist 130 may be associated with a single item of expiration information 140 applicable to the included media content. The expiration information 140 may include one or more of a unit of time to wait after receipt of the playlist 130 before refreshing the playlist 130, an amount of time after a date stamp or other time associated with the playlist 130 to wait before refreshing the playlist 130, a particular day or time of day after which to refresh the playlist 130, and a period for repeated refresh of the playlist 130.

In block 720, the client computing device 105 determines that the received playlist 130 has expired. For example, based on the identified expiration information 140, the media application 110 may determine that the playlist 130 has expired.

In block 725, the client computing device 105 requests a refreshed playlist 130 from the media server 120. For example, the media application 110 may cause the client computing device 105 to retrieve the same playlist 130 again from the media server 120.

In block 730, the client computing device 105 continues playback of the media content using the refreshed playlist 130. Accordingly, the media application 110 may replace its use of the playlist 130 with the refreshed playlist 130. In some examples, the media application 110 may flush any buffered media segments 125 retrieved according to the old playlist 130, and may proceed to perform playback using the media segments 125 specified in the refreshed playlist 130.

After block 730, the process 700 ends. Variations on the process 700 are possible. For example, in the case of a playlist 130 that expires multiple times during playback, blocks 720-730 may be performed multiple times during playback of media content. As another example, the playlist 130 may itself include its own expiration information 140 without using a variant playlist 130. As yet a further example, the variant playlist 130 may include its own expiration information 140 configured to cause the client computing device 105 to request a refreshed version of the variant playlist 130 itself.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

In general, computing systems and devices, such as client computing device 105, may employ any of a number of computer operating systems, including, but by no means limited to, versions and varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance.

Computing devices such as client computing device 105 generally include computer-executable instructions, where the instructions may be executable by one or more computing devices such as those listed above. Computer-executable instructions may be compiled or interpreted from computer programs created using a variety of programming languages and technologies, including, without limitation, and either alone or in combination, Java™, C, C++, Visual Basic, Java Script, Perl, etc. In general, a processor or microprocessor receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein. The media application 110 may be one such computer program product. In some example, the media application 110 may be provided as software that when executed by the processor provides the operations described herein. Alternatively, the media application 110 may be provided as hardware or firmware, or combinations of software, hardware and firmware.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system, comprising:
a media server having a processor and a memory, the media server being configured to:
receive a request for a playlist from a client computing device, the playlist referencing a plurality of alternate streams each associated with its own expiration information indicative of when the respective stream becomes obsolete, the playlist becoming obsolete after all the alternate streams are obsolete, wherein the alternate streams are versions of a same media segment encoded at different bandwidths;
provide the requested playlist to the client computing device;
revise the playlist to generate a refreshed version of the playlist before the playlist becomes obsolete; and
receive from the client computing device a request for the refreshed version of the requested playlist according to the expiration information after the refreshed version is generated;
wherein the expiration information specifies at least one of: (i) a unit of time to wait after receipt of the playlist before refreshing the playlist; (ii) an amount of time after a date stamp or other time associated with the playlist to wait before refreshing the playlist; (iii) a particular day or time of day after which to refresh the playlist; and (iv) a period for repeated refresh of the playlist.

2. The system of claim 1, the media server further configured to provide a variant playlist to the client computing device, the variant playlist specifying the plurality of alternate streams in the form of a plurality of playlists each associated with one of the plurality of alternate streams, the requested playlist being one of the plurality of playlists of the variant playlist, the expiration information being included in the variant playlist.

3. The system of claim 1, the media server further configured to:
provide a first plurality of media segments in the playlist; and
provide a second plurality of media segments in the refreshed playlist, the second plurality of media segments differing from those of the first plurality of media segments.

4. The system of claim 1, wherein the refreshed playlist includes a second plurality of alternate streams, the second plurality of alternate streams differing from those of the first plurality of alternate streams.

5. The system of claim 4, the media server further configured to provide the requested playlist such that at least one of: (i) the second plurality of alternate streams include an additional alternate stream not present in the first plurality of alternate streams; (ii) the first plurality of alternate streams includes an alternate stream removed in the second plurality of alternate streams; and (iii) an alternate stream is maintained in the second plurality of alternate streams from the first plurality of alternate streams but assigned to a different bandwidth.

6. The system of claim 4, the media server further configured to determine at least a portion of the second plurality of alternate streams of the refreshed playlist according to a level of load of the media server.

7. The system of claim 1, the media server further configured to determine at least a portion of the expiration information according to a level of load of the media server.

8. A method, comprising:
receiving a request for a playlist from a client by a media server, the requested playlist referencing a plurality of alternate streams each associated with its own expiration information, the expiration information indicating when the respective stream becomes obsolete, the requested playlist becoming obsolete after all the alternate streams become obsolete, wherein the alternate streams are versions of a same media segment encoded at different bandwidths;
providing the requested playlist to the client; and
revising the playlist by the media server to generate a refreshed version of the playlist before the playlist becomes obsolete; and
receiving a request for the refreshed version of the requested playlist according to the expiration information after the refreshed version is generated;
wherein the expiration information specifies at least one of: (i) a unit of time to wait after receipt of the playlist before refreshing the playlist; (ii) an amount of time after a date stamp or other time associated with the playlist to wait before refreshing the playlist; (iii) a particular day or time of day after which to refresh the playlist; and (iv) a period for repeated refresh of the playlist.

9. The method of claim 8, further comprising providing a variant playlist to the client computing device, the variant playlist specifying the plurality of alternate streams in the form of a plurality of playlists each associated with one of the plurality of alternate streams, the requested playlist being one of the plurality of playlists of the variant playlist, the expiration information being included in the variant playlist.

10. The method of claim 8, further comprising:
providing a first plurality of media segments in the playlist; and
providing a second plurality of media segments in the refreshed playlist, the second plurality of media segments differing from those of the first plurality of media segments.

11. The method of claim 8, further comprising:
providing a first plurality of alternate streams in the playlist; and
providing a second plurality of alternate streams in the refreshed playlist, the second plurality of alternate streams differing from those of the first plurality of alternate streams.

12. The method of claim 11, further comprising providing the requested playlist such that at least one of: (i) the second plurality of alternate streams include an additional alternate stream not present in the first plurality of alternate streams; (ii) the first plurality of alternate streams includes an alternate stream removed in the second plurality of alternate streams; and (iii) an alternate stream is maintained in the second plurality of alternate streams from the first plurality of alternate streams but assigned to a different bandwidth.

13. The method of claim 8, further comprising determining at least a portion of the expiration information according to a level of load of the media server.

14. A method, comprising:
sending, to a server by a client computing device over a communications network, a request for a playlist, the requested playlist referencing a plurality of alternate streams each associated with its own expiration information, the expiration information indicating when the respective stream becomes obsolete, the requested playlist becoming obsolete after all the alternate streams become obsolete, wherein the alternate streams are versions of a same media segment encoded at different bandwidths;

receiving the requested playlist from the server by the client computing device;

streaming one of the alternate streams having a bandwidth best suited to the client computing device based at least on a connection to the communications network;

determining according to the expiration information when the requested playlist will expire; and when the playlist is determined to expire, sending to the server by the client computing device, a request for a refreshed version of the playlist;

wherein the expiration information specifies at least one of: (i) a unit of time to wait after receipt of the playlist before refreshing the playlist; (ii) an amount of time after a date stamp or other time associated with the playlist to wait before refreshing the playlist; (iii) a particular day or time of day after which to refresh the playlist; and (iv) a period for repeated refresh of the playlist.

15. The method of claim 14, further comprising receiving, by the client computing device a variant playlist from the server, the variant playlist specifying the plurality of alternate streams in the form of a plurality of playlists each associated with one of the plurality of alternate streams, the requested playlist being one of the plurality of playlists, the expiration information being included in the variant playlist.

16. The method of claim 14, further comprising:
receiving the refreshed version of the playlist by the client; and
continuing playback using the refreshed playlist.

17. The method of claim 16, further comprising flushing buffered media segments retrieved according to the playlist before continuing playback using the refreshed playlist.

18. A non-transitory computer readable medium storing a media application software program, the media application being executable to provide operations comprising:
sending, to a server over a communications network, a request for a playlist, the requested playlist referencing a plurality of alternate streams each associated with its own expiration information, the expiration information indicating when the respective stream becomes obsolete, the playlist becoming obsolete after all the alternate streams are obsolete, wherein the alternate streams are versions of a same media segment encoded at different bandwidths;

receiving the requested playlist from the server;

streaming one of the alternate streams based at least on a connection to the communications network;

determining according to the expiration information when the requested playlist will expire; and when the playlist is determined to expire, sending to the server a request for a refreshed version of the playlist;

wherein the expiration information specifies at least one of: (i) a unit of time to wait after receipt of the playlist before refreshing the playlist; (ii) an amount of time after a date stamp or other time associated with the playlist to wait before refreshing the playlist; (iii) a particular day or time of day after which to refresh the playlist; and (iv) a period for repeated refresh of the playlist.

19. The non-transitory computer readable medium of claim 16, the service application being further executable to provide operations comprising receiving a variant playlist from the server, the variant playlist specifying the plurality of alternate streams in the form of a plurality of playlists each associated with one of the plurality of alternate streams, the requested playlist being one of the plurality of playlists, the expiration information being included in the variant playlist.

20. The non-transitory computer readable medium of claim 16, the service application being further executable to provide operations comprising:
receiving the refreshed version of the playlist; and
continuing playback using the refreshed playlist.

21. The method of claim 14, upon expiration of the playlist, clearing from the client computing device downloaded media content associated with the expired playlist.

22. The method of claim 14, wherein the refreshed version of the playlist is generated by the server prior to the sending of the request for the refreshed version of the playlist by the client computing device.

* * * * *